(12) United States Patent
Lu

(10) Patent No.: US 10,281,774 B2
(45) Date of Patent: May 7, 2019

(54) DISPLAY PANEL, METHOD FOR PRODUCING THE SAME AND LIQUID CRYSTAL DISPLAY SCREEN

(71) Applicants: BOE Technology Group Co., Ltd., Beijing (CN); Ordos Yuansheng Optoelectronics Co., Ltd., Inner Mongolia (CN)

(72) Inventor: TingLai Lu, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 58 days.

(21) Appl. No.: 15/529,617

(22) PCT Filed: Jun. 21, 2016

(86) PCT No.: PCT/CN2016/086547
§ 371 (c)(1),
(2) Date: May 25, 2017

(87) PCT Pub. No.: WO2017/161711
PCT Pub. Date: Sep. 28, 2017

(65) Prior Publication Data
US 2018/0180921 A1 Jun. 28, 2018

(30) Foreign Application Priority Data
Mar. 21, 2016 (CN) .......................... 2016 1 0159228

(51) Int. Cl.
*G02F 1/1339* (2006.01)
(52) U.S. Cl.
CPC ................... *G02F 1/13394* (2013.01); *G02F 2001/13396* (2013.01)

(58) Field of Classification Search
CPC ............................................. G02F 2001/13396
See application file for complete search history.

(56) References Cited

U.S. PATENT DOCUMENTS

| | | | |
|---|---|---|---|
| 7,932,985 B2 | 4/2011 | Oh | |
| 2005/0243261 A1* | 11/2005 | Chiang | ............. G02F 1/133514 349/155 |

(Continued)

FOREIGN PATENT DOCUMENTS

| | | |
|---|---|---|
| CN | 101315496 A | 12/2008 |
| CN | 101526701 A | 9/2009 |

(Continued)

OTHER PUBLICATIONS

First Office Action, including Search Report, for Chinese Patent Application No. 201610159228.4, dated Apr. 2, 2018, 21 pages.

(Continued)

*Primary Examiner* — Alexander P Gross
(74) *Attorney, Agent, or Firm* — Westman, Champlin & Koehler, P.A.

(57) ABSTRACT

The present disclosure provides a display panel, a method for producing a display panel and a liquid crystal display screen and belongs to the field of display. The display panel includes: a first substrate and a second substrate assembled and opposed to each other; and a liquid crystal layer arranged between the first substrate and the second substrate, wherein a main photo spacer, a first subsidiary photo spacer and a second subsidiary photo spacer are arranged on a side of the first substrate facing towards the second substrate, and the main photo spacer has a height equal to a thickness of the liquid crystal layer, and the first subsidiary photo spacer has a height greater than a height of the second subsidiary photo spacer and less than or equal to thickness of the liquid crystal layer.

14 Claims, 6 Drawing Sheets

(56) References Cited

U.S. PATENT DOCUMENTS

| | | | |
|---|---|---|---|
| 2009/0058826 A1 | 3/2009 | Lee et al. | |
| 2009/0207371 A1* | 8/2009 | Yamamoto | G02F 1/13394 349/156 |
| 2012/0081640 A1 | 4/2012 | Kim et al. | |
| 2012/0314163 A1* | 12/2012 | Joo | G02F 1/13394 349/106 |
| 2013/0050619 A1* | 2/2013 | Kim | G02F 1/13394 349/106 |
| 2014/0127840 A1 | 5/2014 | Baek et al. | |
| 2016/0231607 A1 | 8/2016 | Wu et al. | |

FOREIGN PATENT DOCUMENTS

| | | |
|---|---|---|
| CN | 202150000 U | 2/2012 |
| CN | 103955096 A | 7/2014 |
| CN | 104460121 A | 3/2015 |
| CN | 105116628 A | 12/2015 |
| CN | 105589266 A | 5/2016 |

OTHER PUBLICATIONS

International Search Report and Written Opinion for International Application No. PCT/CN2016/086547, dated Dec. 20, 2016, 9 pages.

English translation of International Search Report and Box V of the Written Opinion for International Application No. PCT/CN2016/086547, 6 pages.

* cited by examiner

DISPLAY PANEL, METHOD FOR PRODUCING THE SAME AND LIQUID CRYSTAL DISPLAY SCREEN

CROSS-REFERENCE TO RELATED APPLICATION

This application is a Section 371 National Stage of International Application No. PCT/CN2016/086547, filed on 21 Jun. 2016, which has not yet published, and claims priority to Chinese Patent Application No. 201610159228.4, filed with SIPO on 21 Mar. 2016, the contents of which are incorporated herein by reference in their entirety.

BACKGROUND OF THE DISCLOSURE

Field of the Disclosure

The present disclosure relates to the field of display, and in particular, to a display panel, a method for producing a display panel and a liquid crystal display screen.

Description of the Related Art

The liquid crystal display screen is popular in flat display screens at present. The liquid crystal display screen includes two substrates assembled and opposed to each other and a liquid crystal layer arranged between the two substrates. As an example, the two substrates may be one color filter substrate and one array substrate respectively.

In the liquid crystal display screen, a plurality of sets of photo spacers (abbreviated as PS) arranged in array are formed on a side of the color filter substrate facing towards the array substrate. When the liquid crystal display screen is pressed, the liquid crystal in the liquid crystal layer may flow away from the pressed position such that the liquid crystal display screen presents ripples.

When the liquid crystal display screen is pressed, the intensity of the ripples present on the liquid crystal display screen may affect display quality of the liquid crystal display screen adversely. In the prior art, due to the limitation of the liquid crystal display screen in structure, the intensity of the ripples present on the liquid crystal display screen becomes strong when the liquid crystal display screen is pressed.

SUMMARY

An embodiment of the present disclosure provides a display panel including: a first substrate and a second substrate assembled and opposed to each other; and a liquid crystal layer arranged between the first substrate and the second substrate, wherein a main photo spacer, a first subsidiary photo spacer and a second subsidiary photo spacer are arranged on a side of the first substrate facing towards the second substrate, and the main photo spacer has a height equal to a thickness of the liquid crystal layer, and the first subsidiary photo spacer has a height greater than a height of the second subsidiary photo spacer and less than or equal to the thickness of the liquid crystal layer.

In an embodiment, the height of the first subsidiary photo spacer is equal to the thickness of the liquid crystal layer, and the first subsidiary photo spacer has a cross sectional area equal to a cross sectional area of the second subsidiary photo spacer and less than a cross sectional area of the main photo spacer.

In an embodiment, the first substrate includes a display area and a non-display area surrounding the display area, the display area being composed of a central closed area and an annular area surrounding the central closed area, and a plurality of sets of the photo spacers are arranged in array in the display area on the first substrate; wherein the sets of the photo spacers arranged in the central closed area include the main photo spacers and the second subsidiary photo spacers; and wherein the sets of the photo spacers arranged in the annular area include the main photo spacers and the first subsidiary photo spacers or include the main photo spacers, the first subsidiary photo spacers and the second subsidiary photo spacers.

In an embodiment, the first subsidiary photo spacers arranged in the sets of the photo spacers in the annular area have a density which decreases gradually along a direction from a periphery of the display area towards a center of the display area.

In an embodiment, the first subsidiary photo spacers arranged in the sets of the photo spacers in the annular area have a density which decreases gradually in a descending order of power along the direction from the periphery of the display area towards the center of the display area.

In an embodiment, the annular area has a width which is greater than or equal to 2 millimeters and less than or equal to 5 millimeters.

An embodiment of the present disclosure provides a method for producing a display panel, the method including: forming a first substrate; forming a second substrate; and assembling the first substrate and the second substrate to be opposed to each other and charging liquid crystal into a space between the first substrate and the second substrate to form a liquid crystal layer, wherein the first substrate, the second substrate and the liquid crystal layer form a liquid crystal cell, wherein the method further includes forming a main photo spacer, a first subsidiary photo spacer and a second subsidiary photo spacer on a side of the first substrate facing towards the second substrate before assembling the first substrate and the second substrate, and wherein in the formed liquid crystal cell, the main photo spacer has a height equal to a thickness of the liquid crystal layer, and the first subsidiary photo spacer has a height greater than a height of the second subsidiary photo spacer and less than or equal to the thickness of the liquid crystal layer.

In an embodiment, the height of the first subsidiary photo spacer is equal to the thickness of the liquid crystal layer, and the first subsidiary photo spacer has a cross sectional area equal to a cross sectional area of the second subsidiary photo spacer and less than a cross sectional area of the main photo spacer.

In an embodiment, the first substrate includes a display area and a non-display area surrounding the display area, the display area being composed of a central closed area and an annular area surrounding the central closed area, and forming a main photo spacer, a first subsidiary photo spacer and a second subsidiary photo spacer on a side of the first substrate facing towards the second substrate includes:

forming a plurality of sets of the photo spacers arranged in array in the display area on the first substrate;

wherein the sets of the photo spacers arranged in the central closed area include the main photo spacers and the second subsidiary photo spacers; and wherein the sets of the photo spacers arranged in the annular area include the main photo spacers and the first subsidiary photo spacers or include the main photo spacers, the first subsidiary photo spacers and the second subsidiary photo spacers.

In an embodiment, the first subsidiary photo spacers arranged in the sets of the photo spacers in the annular area have a density which decreases gradually along a direction from a periphery of the display area towards a center of the display area.

In an embodiment, the first subsidiary photo spacers arranged in the sets of the photo spacers in the annular area have a density which decreases gradually in a descending order of power along the direction from the periphery of the display area towards the center of the display area.

In an embodiment, forming a plurality of sets of the photo spacers arranged in array in the display area on the first substrate includes:

forming a photoresist layer in the display area on the first substrate;

patterning the photoresist layer by using a multicolor or grayscale mask through a single patterning process to form the plurality of sets of the photo spacers arranged in array.

In an embodiment, the annular area has a width which is greater than or equal to 2 millimeters and less than or equal to 5 millimeters.

An embodiment of the present disclosure provides a liquid crystal display screen, including the display panel as described in any one of the above embodiments.

BRIEF DESCRIPTION OF THE DRAWINGS

In order to explain technical solutions of embodiments in the present disclosure more clearly, the drawings for the embodiments will be described briefly below. Apparently, the following drawings show only some of embodiments in the present disclosure. From these drawings, the skilled person in the art may also obtain other drawings without any creative efforts.

FIG. 6-1 shows a flow chart of a method for producing another display panel according to an embodiment of the present disclosure;

FIG. 6-2 shows a schematic view showing a structure of a first substrate according to an embodiment of the present disclosure;

FIG. 6-3 is a schematic view showing a local structure of another display panel according to an embodiment of the present disclosure; and FIG. 6-4 is a schematic view showing a local structure of a further display panel according to an embodiment of the present disclosure.

DETAILED DESCRIPTION OF PREFERRED EMBODIMENTS OF THE DISCLOSURE

Figure 1:
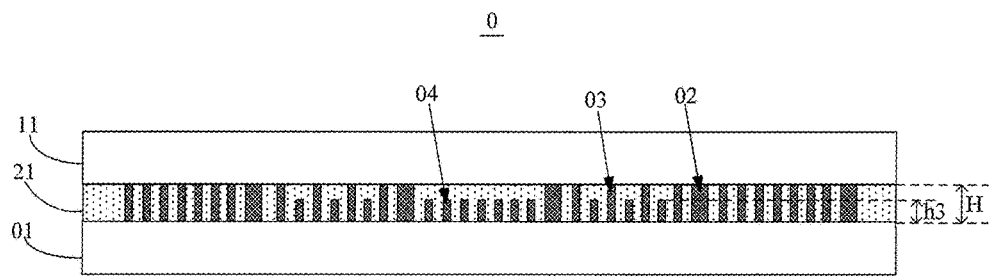
FIG. 1 is a schematic view showing a structure of a display panel according to an embodiment of the present disclosure.

The details of embodiments of the present disclosure will below be explained with reference to drawings such that objects, technical solutions and advantages of the present disclosure become more explicit.

In accordance with a generic concept, an embodiment of the present disclosure provides a display panel including: a first substrate and a second substrate assembled and opposed to each other; and a liquid crystal layer arranged between the first substrate and the second substrate, wherein a main photo spacer, a first subsidiary photo spacer and a second subsidiary photo spacer are arranged on a side of the first substrate facing towards the second substrate, and the main photo spacer has a height equal to a thickness of the liquid crystal layer, and the first subsidiary photo spacer has a height greater than a height of the second subsidiary photo spacer and less than or equal to the thickness of the liquid crystal layer.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIG. 1, an embodiment of the present disclosure provides a display panel 0. The display panel 0 may include: a first substrate 01 and a second substrate 11; and a liquid crystal layer 21 arranged between the first substrate 01 and the second substrate 11. A main photo spacer (PS) 02, a first subsidiary photo spacer 03 and a second subsidiary photo spacer 04 are arranged on a side of the first substrate 01 facing towards the second substrate 11. The main photo spacer 02 has a height equal to a thickness H of the liquid crystal layer 21, and the first subsidiary photo spacer 03 has a height greater than a height h3 of the second subsidiary photo spacer 04 and less than or equal to the thickness H of the liquid crystal layer 21.

As discussed above, in the display panel provided by the embodiment of the present disclosure, the main photo spacer, the first subsidiary photo spacer and the second subsidiary photo spacer are arranged on the side of the first substrate facing towards the second substrate. The height of the main photo spacer is equal to the thickness of the liquid crystal layer, and the height of the first subsidiary photo spacer is greater than the height of the second subsidiary photo spacer and less than or equal to the thickness of the liquid crystal layer. When the flow state of the liquid crystal is a laminar flow state, the effect of the resistance to the flow speed of the liquid crystal is relatively large and the flow speed of the liquid crystal is positively correlated to Reynolds number and negatively correlated to intensity of ripples. And each of the main photo spacer, the first subsidiary photo spacer and the second subsidiary photo spacer may form resistance in flowing process of the liquid crystal and the height of the first subsidiary photo spacer is greater than that of the second subsidiary photo spacer, thus, the effective areas of the main photo spacer, the first subsidiary photo spacer and the second subsidiary photo spacer for blocking the flow of the liquid crystal become relatively large so as to generate relatively large resistance. In this way, the flowing speed of the liquid crystal is reduced, the Reynolds number is reduced accordingly and further the intensity of the ripples is decreased, so as to improve the display quality of the liquid crystal display screen.

Figure 2:
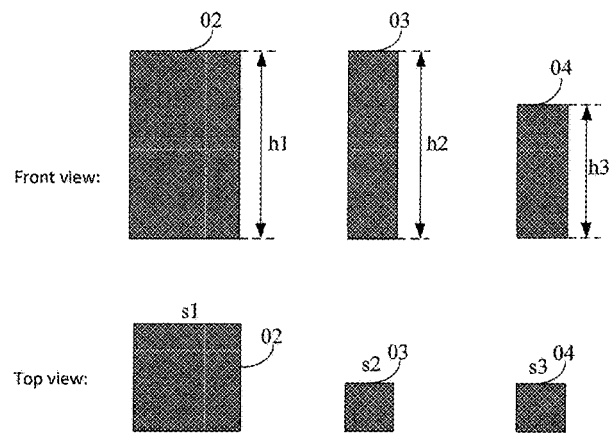
FIG. 2 is a schematic view showing structures of photo spacers in a display panel according to an embodiment of the present disclosure.

FIG. 2 is a schematic view showing structures of photo spacers in a display panel according to an embodiment of the present disclosure. As illustrated in FIG. 2, in the display panel (see FIG. 1), the height h1 of the main photo spacer 02 is equal to the height h2 of the first subsidiary photo spacer 03. The height h1 of the main photo spacer 02 and the height h2 of the first subsidiary photo spacer 03 are both equal to the thickness of the liquid crystal layer in the display panel (see FIG. 1) and greater than the height h3 of the second subsidiary photo spacer 04. The first subsidiary photo spacer 03 has a cross sectional area s2 equal to the cross sectional area s3 of the second subsidiary photo spacer 04 and less than the cross sectional area s1 of the main photo spacer 02.

As an example, the first substrate may be a color filter substrate and the plurality of sets of the main photo spacers, the first subsidiary photo spacers and the second subsidiary photo spacers arranged in array may be formed on the side of the color filter substrate facing towards an opposite substrate. In embodiments of the present disclosure, the specific values of the heights and the cross sectional areas of the main photo spacers, the first subsidiary photo spacers and the second subsidiary photo spacers may be set based on the requirements for design of the display panel in the prior art, such as thickness of the liquid crystal layer, the Reynolds number.

Figure 3:
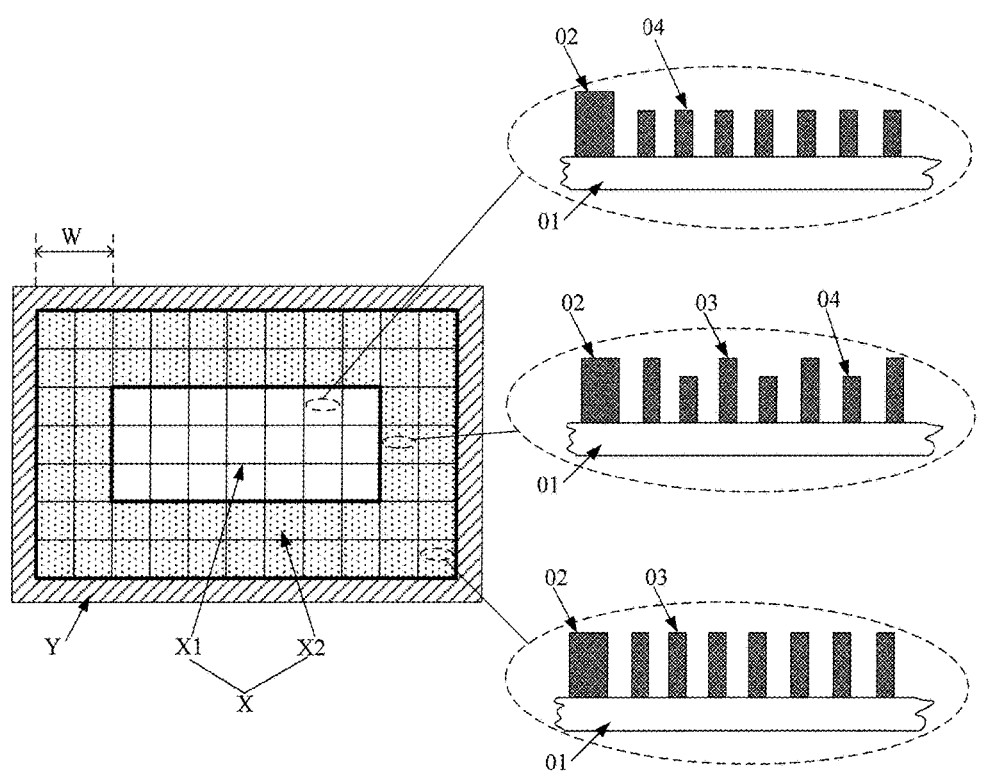
FIG. 3 is a schematic view showing a local structure of a display panel according to an embodiment of the present disclosure.

FIG. 3 is a schematic view showing a local structure of a display panel according to an embodiment of the present disclosure. Referring to FIG. 3, the first substrate 01 may includes a display area X and a non-display area Y surrounding the display area X. In an example, the display area X may be called as an active area (abbreviated as AA) and the non-display area Y is also called as a peripheral area. The display area X is composed of a central closed area X1 and an annular area X2 surrounding the central closed area X1. A plurality of sets of the photo spacers arranged in array are formed in the display area X on the first substrate 01. In an example, the sets of the photo spacers arranged in the central closed area X1 may include the main photo spacers 02 and the second subsidiary photo spacers 04; and the sets of the photo spacers arranged in the annular area X2 may include the main photo spacers 02 and the first subsidiary photo spacers 03 or include the main photo spacers 02, the first subsidiary photo spacers 03 and the second subsidiary photo spacers 04. The intensity of the ripples becomes relatively large at a periphery of the display area X, thus, the first subsidiary photo spacers 03 may be arranged in the annular area X2 close to the periphery of the display area X to reduce the intensity of the ripples at the periphery of the display region X.

It should be noted that FIG. 3 is a top view showing the first substrate and respective photo spacers on the first substrate in the display panel and the dashed enlarged areas thereof show enlarged local cross sectional views of the display panel.

As an example, the shape of the display area X may be similar to the shape of the central closed area X1. The center of the display area X coincides with the center of the central closed area X1. The central closed area X1 is located in the display area X. The annular area X2 is located between the display area X and the central closed area X1. The inner edge of the annular area X2 coincides with the periphery of the central closed area X1. The outer edge of the annular area X2 coincides with the periphery of the display area X.

In an example, the first subsidiary photo spacers 03 arranged in the sets of the photo spacers 03 in the annular area X2 have density which decreases gradually in a direction from a periphery of the display area X towards a center of the display area X. As an example, it is assumed that a first set of photo spacers, a second set of photo spacers and a third set of photo spacers in the annular area X2 are arranged in order along a direction from the periphery of the display area X to the center of the display area X. The first set of the photo spacers includes 100 photo spacers in total which include one main photo spacer and 99 first subsidiary photo spacers, thus, the density of the first subsidiary photo spacers 03 in the first set of the photo spacers is 99%. The second set of the photo spacers includes 100 photo spacers in total which include one main photo spacer, 10 second subsidiary photo spacers and 89 first subsidiary photo spacers, thus, the density of the first subsidiary photo spacers 03 in the second set of the photo spacers is 89%. The third set of the photo spacers includes 100 photo spacers in total which include one main photo spacer, 20 second subsidiary photo spacers and 79 first subsidiary photo spacers, thus, the density of the first subsidiary photo spacers 03 in the third set of the photo spacers is 79%. It can be seen that the density 99% of the first subsidiary photo spacers in the first set of the photo spacers is greater than the density 89% of the first subsidiary photo spacers in the second set of the photo spacers and the density 89% of the first subsidiary photo spacers in the second set of the photo spacers is greater than the density 79% of the first subsidiary photo spacers in the third set of the photo spacers, that is, the density of the first subsidiary photo spacers in the sets of the photo spacers in the annular area X2 decreases gradually along the direction from the periphery of the display area X towards the center of the display area X. As an example, the density of the first subsidiary photo spacers 03 arranged in the sets of the photo spacers in the annular area X2 decreases gradually in a descending order of power along a direction from a periphery of the display area X towards a center of the display area X. So called "decreasing gradually in a descending order of power" means the factors by which the density of the first subsidiary photo spacers 03 decreases are listed in a descending order of power. For example, it is assumed that a first set of photo spacers, a second set of photo spacers and a third set of photo spacers in the annular area X2 are arranged in order along a direction from the periphery of the display area X to the center of the display area X. The first set of the photo spacers includes 100 photo spacers in total which include 4 main photo spacers and 96 first subsidiary photo spacers, thus, the density of the first subsidiary photo spacers 03 in the first set of the photo spacers is 96%. The second set of the photo spacers includes 100 photo spacers in total which include 4 main photo spacer, 48 second subsidiary photo spacers and 48 first subsidiary photo spacers, thus, the density of the first subsidiary photo spacers 03 in the second set of the photo spacers is 48%. The third set of the photo spacers includes 100 photo spacers in total which include 4 main photo spacer, 72 second subsidiary photo spacers and 24 first subsidiary photo spacers, thus, the density of the first subsidiary photo spacers 03 in the third set of the photo spacers is 24%. In this way, the density of the first subsidiary photo spacers 03 in the second set of the photo spacers is ½ of the density of the first subsidiary photo spacers 03 in the first set of the photo spacers and the density of the first subsidiary photo spacers 03 in the third set of the photo spacers is ¼, i.e., second power of ½, of the density of the first subsidiary photo spacers 03 in the first set of the photo spacers. Thus, the factors by which the density of the first subsidiary photo spacers 03 decreases in the first set of the photo spacers, the second set of the photo spacers and the third set of the photo spacers are zeroth power of ½, first power of ½ and second power of ½ respectively in sequence. It is an example for satisfying "decreasing gradually in a descending order of power". However, the present disclosure is not limited to this. The base number of the descending factors is not limited to ½ and the power exponents of the factors are also not limited to the zeroth power, the first power and the second power. Instead, the base number and the power exponents may be selected arbitrarily as required, as long as the factors by which the density of the first subsidiary photo spacers 03 decreases in the areas arranged from the periphery of the display area X towards the center of the display area X satisfy decreasing power exponents in sequence.

The intensity of the ripples becomes relatively large at the periphery of the display area X while the intensity of the ripples becomes relatively small at the center of the display area X. That is, the intensity of the ripples decreases in sequence along the direction from the periphery of the display area X towards the center of the display area X. Thus, the density of the first subsidiary photo spacers in the sets of the photo spacers decreases in sequence along the direction from the periphery of the display area X towards the center of the display area X, which satisfies the rule of the distribution of the intensity of ripples.

In an example, the annular area X2 has a width W which may be greater than or equal to 2 millimeters and less than or equal to 5 millimeters. It should be noted that in FIG. 3, the display area X is a rectangular area and the central closed area X1 is also a rectangular area. In this way, the annular area X2 is a rectangular ring area and the width of the annular area X2 is the minimum distance between the central closed area X1 and any one side of the display area X. Alternatively, the display area and the central closed area may both have circular shapes. In this way, the annular area will be a circular ring area and the width of the annular area is a difference between the radius of the display area and the radius of the central closed area.

Figure 4:
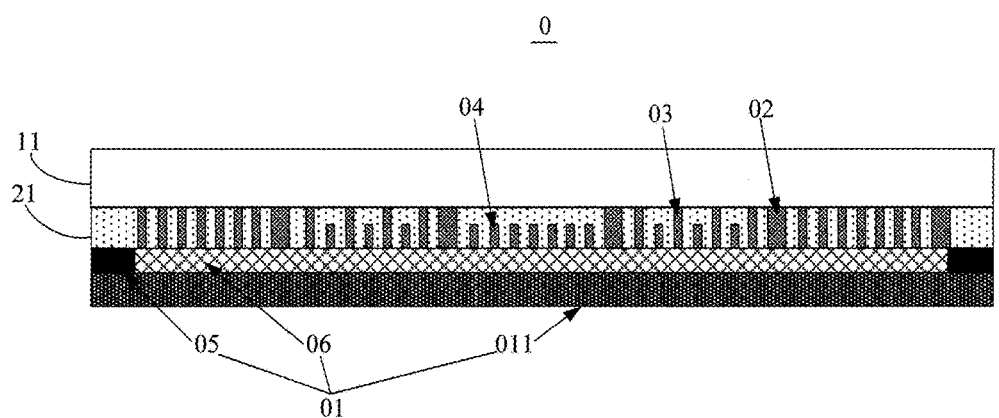
FIG. 4 is a schematic view showing a structure of another display panel according to an embodiment of the present disclosure.

As an example, FIG. 4 is a schematic view showing a structure of another display panel 0 according to an embodiment of the present disclosure. As shown in FIG. 4, the first substrate 01 in the display panel 0 may be a color filter substrate. In this way, the first substrate 01 may include a base substrate 011 and a black matrix (abbreviated as BM) 05 formed in the non-display area on the base substrate 011; and a color film layer 06 in the display area on the base substrate 011. The main photo spacer 02, the first subsidiary photo spacer 03 and the second subsidiary photo spacer 04 may be formed on the color film layer 06 and/or the black matrix 05. When the first substrate is the color filter substrate, the second substrate may be an array substrate.

Alternatively, the first substrate may also be an array substrate. In this way, the first substrate may include a base substrate and a thin film transistor (abbreviated as TFT) structure formed on the base substrate. The main photo spacer, the first subsidiary photo spacer and the second subsidiary photo spacer may be formed on the TFT structure. When the first substrate is the array substrate, the second substrate may be the color filter substrate.

In the art, the CF & Cell (color filter and Assembling the substrates into Cell) process has reached the limit of process capability. Thus, when the liquid crystal display screen is pressed, the main photo spacer and the subsidiary photo spacers can block the flow of the liquid crystal. The effective area of the main photo spacers for blocking the flow of liquid crystal is relatively large while the effective area of the subsidiary photo spacers for blocking the flow of liquid crystal is relatively small. And the number of the main photo spacers is relatively small, such that the effects of the main photo spacers and the subsidiary photo spacers on the liquid crystal display screen blocking the flow of the liquid crystal become relatively small and the intensity of the ripples presented on the liquid crystal display screen becomes strong.

It should be noted that when the display panel is pressed, the liquid crystal in the display panel may flow away from the pressed position. And the flow speed of the liquid crystal is relatively small and the Reynolds number is relatively small. In this way, the flow state of the liquid crystal is a laminar flow state. When the flow state of the liquid crystal is the laminar flow state, the effect of the resistance to the flow speed of the liquid crystal is relatively large and the flow speed of the liquid crystal is positively correlated to Reynolds number and negatively correlated to the intensity of ripples. In an embodiment of the present disclosure, when the liquid crystal display screen is pressed such that the liquid crystal in the liquid crystal layer flows away from the pressed position, all of the main photo spacers, the first subsidiary photo spacer and the second subsidiary photo spacer can block the flow of the liquid crystal. The effective area of the main photo spacers for blocking the flow of liquid crystal is relatively large and the effective area of the first subsidiary photo spacers for blocking the flow of liquid crystal is also relatively large, and the number of the first subsidiary photo spacers is relatively large (as an example, the number of the first subsidiary photo spacers may be greater than the number of the main photo spacers). Thus, the effects of the main photo spacers, the first subsidiary photo spacers and the second subsidiary photo spacers on the liquid crystal display screen for blocking the flow of the liquid crystal become relatively large such that the flowing speed of the liquid crystal is reduced, the Reynolds number is correspondingly reduced so as to reduce the intensity of the ripple.

As discussed above, in the display panel provided by the embodiment of the present disclosure, the main photo spacer, the first subsidiary photo spacer and the second subsidiary photo spacer are arranged on the side of the first substrate facing towards the second substrate. The height of the main photo spacer is equal to the thickness of the liquid crystal layer, and the height of the first subsidiary photo spacer is greater than the height of the second subsidiary photo spacer and less than or equal to the thickness of the liquid crystal layer. When the flow state of the liquid crystal is a laminar flow state, the effect of the resistance to the flow speed of the liquid crystal is relatively large and the flow speed of the liquid crystal is positively correlated to the Reynolds number and negatively correlated to the intensity of ripples. And each of the main photo spacer, the first subsidiary photo spacer and the second subsidiary photo spacer may form resistance to the flow of the liquid crystal and the height of the first subsidiary photo spacer is greater than that of the second subsidiary photo spacer, thus, the effective areas of the main photo spacer, the first subsidiary photo spacer and the second subsidiary photo spacer for blocking the flow of the liquid crystal become relatively large so as to generate relatively large resistance. In this way, the flowing speed of the liquid crystal is reduced, and the Reynolds number is correspondingly reduced so as to reduce the intensity of the ripples and improve the display quality of the liquid crystal display screen.

Figure 5:
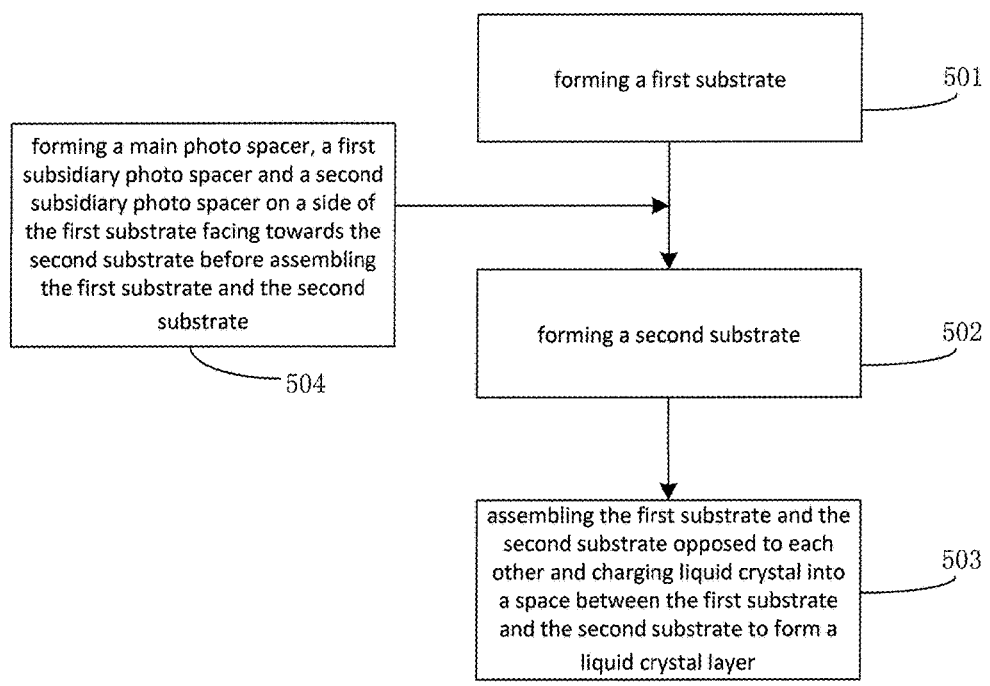
FIG. 5 shows a flow chart of a method for producing a display panel according to an embodiment of the present disclosure.

As illustrated in FIG. 5, an embodiment of the present disclosure provides a method for producing a display panel. The method may be used to produce the display panel shown in FIG. 1, FIG. 3 or FIG. 4. The method may include:

Step 501: forming a first substrate;

Step 502: forming a second substrate; and

Step 503: assembling the first substrate and the second substrate opposed to each other and charging liquid crystal into a space between the first substrate and the second substrate to form a liquid crystal layer, the first substrate, the second substrate and the liquid crystal layer forming a liquid crystal cell.

The method further includes Step 504: forming a main photo spacer, a first subsidiary photo spacer and a second subsidiary photo spacer on a side of the first substrate facing towards the second substrate before assembling the first substrate and the second substrate. In the formed liquid crystal cell, the main photo spacer has a height equal to a thickness of the liquid crystal layer, and the first subsidiary photo spacer has a height greater than the height of the second subsidiary photo spacer and less than or equal to the thickness of the liquid crystal layer. It should be noted that the above Step 501 and the Step 502 may be exchanged in sequence, even such two steps may also be performed simultaneously and the Step 504 only needs to be performed between the Step 501 and the Step 503 independent of the sequence of performing the above Steps 501 and 502.

As discussed above, in the display panel produced by the method provided by the embodiment of the present disclosure, the main photo spacer, the first subsidiary photo spacer and the second subsidiary photo spacer are arranged on the side of the first substrate facing towards the second substrate. The height of the main photo spacer is equal to the thickness of the liquid crystal layer, and the height of the first subsidiary photo spacer is greater than the height of the second subsidiary photo spacer and less than or equal to the thickness of the liquid crystal layer. When the flow state of the liquid crystal is a laminar flow state, the effect of the resistance to the flow speed of the liquid crystal is relatively large and the flow speed of the liquid crystal is positively correlated to the Reynolds number and negatively correlated to the intensity of ripples. And each of the main photo spacer, the first subsidiary photo spacer and the second subsidiary photo spacer may form resistance to the flow of the liquid crystal and the height of the first subsidiary photo spacer is greater than that of the second subsidiary photo spacer, thus, the effective areas of the main photo spacer, the first subsidiary photo spacer and the second subsidiary photo spacer for blocking the flow of the liquid crystal become relatively large so as to generate relatively large resistance. In this way, the flowing speed of the liquid crystal is reduced, and the Reynolds number is reduced to reduce the intensity of the ripples, so as to improve the display quality of the liquid crystal display screen.

As an example, the height of the first subsidiary photo spacer is equal to the thickness of the liquid crystal layer and the first subsidiary photo spacer has a cross sectional area equal to the cross sectional area of the second subsidiary photo spacer and less than the cross sectional area of the main photo spacer.

As an example, the first substrate includes a display area and a non-display area surrounding the display area, the display area being composed of a central closed area and an annular area surrounding the central closed area, and the Step 501 may include:

forming a plurality of sets of the photo spacers arranged in array in the display area on the first substrate, the sets of the photo spacers in the central closed area including the main photo spacers and the second subsidiary photo spacers, the sets of the photo spacers in the annular area including the main photo spacers and the first subsidiary photo spacers or including the main photo spacers, the first subsidiary photo spacers and the second subsidiary photo spacers.

As an example, the first subsidiary photo spacers in the sets of the photo spacers in the annular area have density which decreases gradually along a direction from a periphery of the display area towards a center of the display area.

As an example, the first subsidiary photo spacers in the sets of the photo spacers in the annular area have density which decreases gradually in a descending order of power along a direction from a periphery of the display area towards a center of the display area.

As an example, forming a plurality of sets of the photo spacers arranged in array in the display area on the first substrate includes:

forming a photo resist layer in the display area on the first substrate;

patterning the photo resist layer with single patterning process by a multicolor or grayscale mask to form the plurality of sets of the photo spacers arranged in array.

As an example, the annular area has a width which is greater than or equal to 2 millimeters and less than or equal to 5 millimeters.

As discussed above, in the display panel produced by the method provided by the embodiment of the present disclosure, the main photo spacer, the first subsidiary photo spacer and the second subsidiary photo spacer are arranged on the side of the first substrate facing towards the second substrate. The height of the main photo spacer is equal to the thickness of the liquid crystal layer, and the height of the first subsidiary photo spacer is greater than the height of the second subsidiary photo spacer and less than or equal to the thickness of the liquid crystal layer. When the flow state of the liquid crystal is a laminar flow state, the effect of the resistance to the flow speed of the liquid crystal is relatively large and the flow speed of the liquid crystal is positively correlated to the Reynolds number and negatively correlated to the intensity of ripples. And each of the main photo spacer, the first subsidiary photo spacer and the second subsidiary photo spacer may form resistance to the flow of the liquid crystal and the height of the first subsidiary photo spacer is greater than that of the second subsidiary photo spacer, thus, the effective areas of the main photo spacer, the first subsidiary photo spacer and the second subsidiary photo spacer for blocking the flow of the liquid crystal become relatively large so as to generate relatively large resistance. In this way, the flowing speed of the liquid crystal is reduced, and the Reynolds number is correspondingly reduced to reduce the intensity of the ripples, so as to improve the display quality of the liquid crystal display screen.

Figures 1, 6:
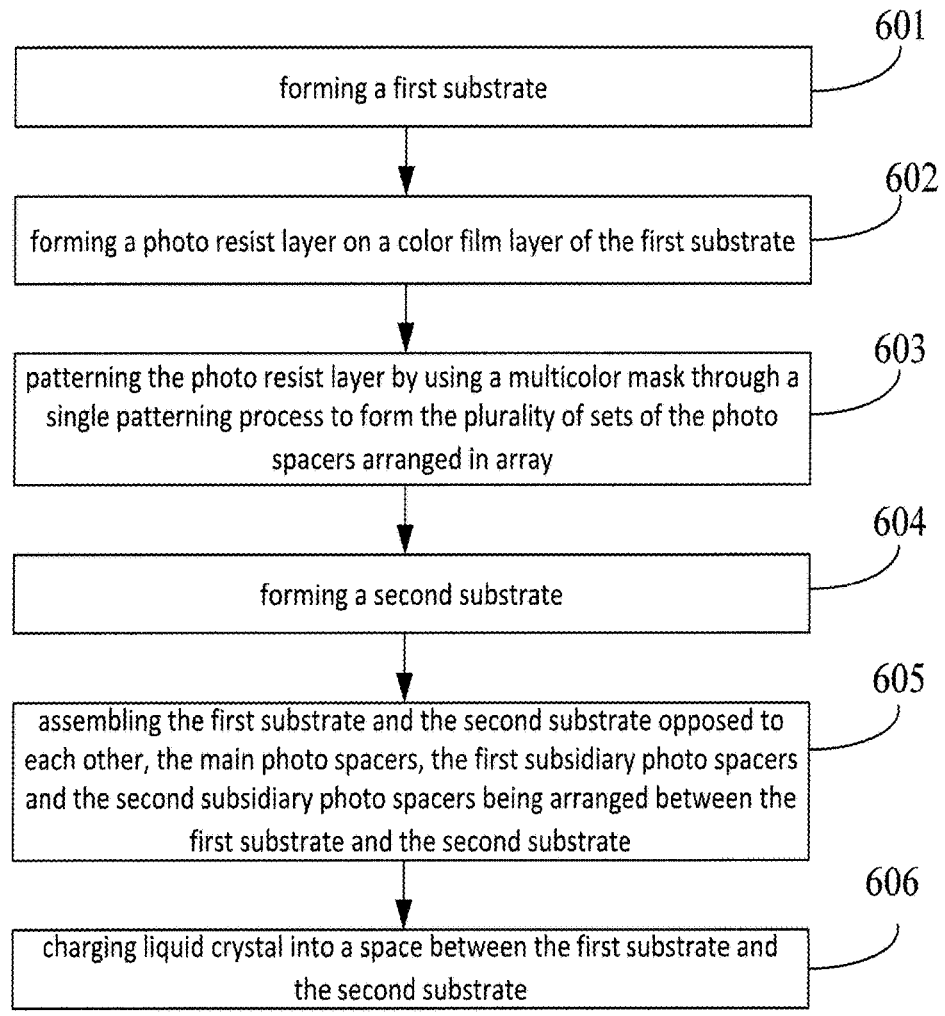
Figures 2, 6:
Figures 3, 6:
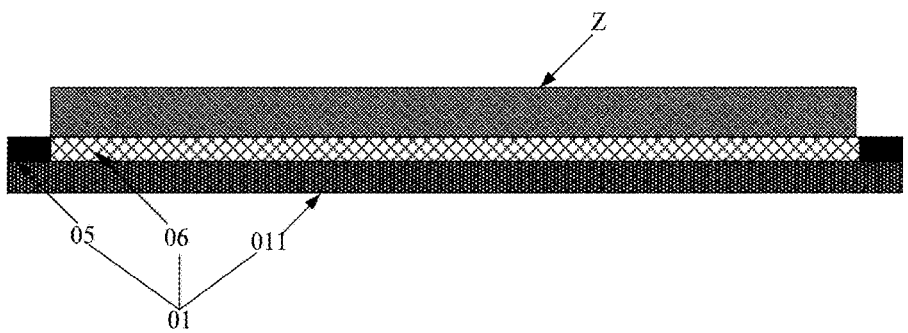
Figures 4, 6:
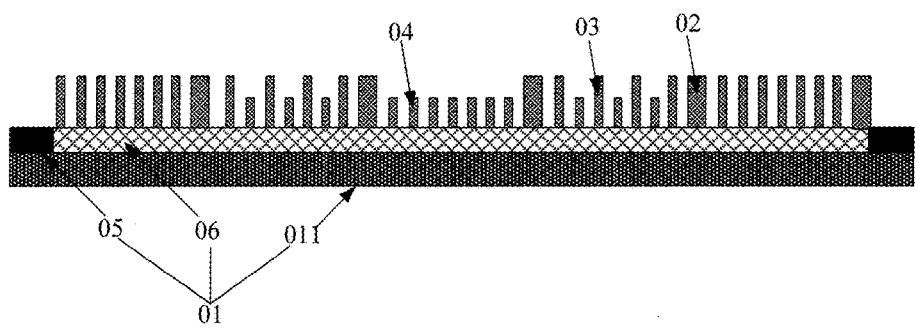

As illustrated in FIG. 6-1, an embodiment of the present disclosure provides another method for producing a display panel. The method may be used to produce the display panel shown in FIG. 1, FIG. 3 or FIG. 4. In an example as shown herein where the first substrate in the display panel is a color filter substrate, the method may include:

Step 601: forming a first substrate.

As an example, the first substrate may be a color filter substrate. When the color filter substrate is formed, a color film layer and a black matrix may be formed on a base substrate respectively. The base substrate may include a display area and a non-display area surrounding the display area. As an example, the display area may be called as an active area. FIG. 6-2 is a schematic view showing a structure of the first substrate 01 provided by an embodiment of the present disclosure. As shown in FIG. 6-2, the color film layer 06 may be formed in the display area on the base substrate 011 and the black matrix 05 is formed in the non-display area on the base substrate 011. As an example, the specific steps of forming the color film layer 06 and the black matrix 05 on the base substrate 011 may follow those steps of forming the color film layer and the black matrix on the base substrate in the prior art. The details thereof will be omitted herein.

Step 602: forming a photo resist layer on the color film layer of the first substrate.

FIG. 6-3 is a schematic view showing a local structure of another display panel according to an embodiment of the present disclosure. As illustrated in FIG. 6-3, after the black matrix 05 and the color film layer 06 are formed on the base substrate 011 to obtain the first substrate 01, the photo resist layer Z may be formed on the color film layer 06 of the first substrate 01 by means of depositing, coating or sputtering.

Step 603: patterning the photo resist layer with single patterning process by a multicolor or grayscale mask to form the plurality of sets of the photo spacers arranged in array.

As an example, the single patterning process may include exposing and developing. As illustrated in FIG. 6-4, after the photo resist layer is exposed to light by the multicolor or grayscale mask and developed, a plurality of main photo spacers 02, a plurality of first subsidiary photo spacers 03 and a plurality of second subsidiary photo spacers 04 may be formed on the first substrate 01. And the plurality of main photo spacers 02, the plurality of first subsidiary photo spacers 03 and the plurality of second subsidiary photo spacers 04 constitute the plurality of sets of the photo spacers arranged in array. In particular, a plurality of regions with different transmittances may be arranged on the multicolor or grayscale mask. The multicolor or grayscale mask may be overlaid above the base substrate 011 formed with the photo resist layer and the photo resist layer below the mask is exposed to the light by the multicolor or grayscale mask. After the light is irradiated on the regions with different transmittances on the multicolor or grayscale mask, the photo resist layer may receive different levels of exposure such that the photo resist layer has different thicknesses after being exposed to the light and developed, so as to form the plurality of main photo spacers 02, the plurality of first subsidiary photo spacers 03 and the plurality of second subsidiary photo spacers 04.

Referring to FIG. 3, the first substrate 01 may includes a display area X and a non-display area Y surrounding the display area X. In an example, the display area X may be called as an active area. The display area X is composed of a central closed area X1 and an annular area X2 surrounding the central closed area X1. A plurality of sets of the photo spacers arranged in array are formed in the display area X on the first substrate 01. In an example, the sets of the photo spacers arranged in the central closed area X1 may include the main photo spacers 02 and the second subsidiary photo spacers 04; and the sets of the photo spacers arranged in the annular area X2 may include the main photo spacers 02 and the first subsidiary photo spacers 03 or include the main photo spacers 02, the first subsidiary photo spacers 03 and the second subsidiary photo spacers 04. The intensity of the ripples becomes relatively large at a periphery of the display area X, thus, the first subsidiary photo spacers 03 may be arranged in the annular area X2 close to the periphery of the display area X to reduce the intensity of the ripples at the periphery of the display region X.

As an example, as shown in FIG. 3, the shape of the display area X may be similar to the shape of the central closed area X1. The center of the display area X coincides with the center of the central closed area X1. The central closed area X1 is located in the display area X. The annular area X2 is located between the display area X and the central closed area X1. The inner edge of the annular area X2 coincides with the periphery of the central closed area X1. The outer edge of the annular area X2 coincides with the periphery of the display area X.

The density of the first subsidiary photo spacers 03 in the sets of the photo spacers in the annular area X2 decreases gradually along a direction from a periphery of the display area X towards a center of the display area X. As an example, it is assumed that a first set of photo spacers, a second set of photo spacers and a third set of photo spacers in the annular area X2 are arranged in order along a direction from the periphery of the display area X to the center of the display area X. The first set of the photo spacers includes 100 photo spacers in total which include one main photo spacer and 99 first subsidiary photo spacers, thus, the density of the first subsidiary photo spacers 03 in the first set of the photo spacers is 99%. The second set of the photo spacers includes 100 photo spacers in total which include one main photo spacer, 10 second subsidiary photo spacers and 89 first subsidiary photo spacers, thus, the density of the first subsidiary photo spacers 03 in the second set of the photo spacers is 89%. The third set of the photo spacers includes 100 photo spacers in total which include one main photo spacer, 20 second subsidiary photo spacers and 79 first subsidiary photo spacers, thus, the density of the first subsidiary photo spacers 03 in the third set of the photo spacers is 79%. It can be seen that the density 99% of the first subsidiary photo spacers in the first set of the photo spacers is greater than the density 89% of the first subsidiary photo spacers in the second set of the photo spacers, and the density 89% of the first subsidiary photo spacers in the second set of the photo spacers is greater than the density 79% of the first subsidiary photo spacers in the third set of the photo spacers, that is, the density of the first subsidiary photo spacers in the sets of the photo spacers in the annular area X2 decreases gradually along the direction from the periphery of the display area X towards the center of the display area X. As an example, the density of the first subsidiary photo spacers 03 arranged in the sets of the photo spacers in the annular area X2 decreases gradually in a descending order of power from a periphery of the display area X towards a center of the display area X.

The intensity of the ripples becomes relatively large at the periphery of the display area X while the intensity of the ripples becomes relatively small at the center of the display area X. That is, the intensity of the ripples decreases in sequence along the direction from the periphery of the display area X towards the center of the display area X. Thus, the density of the first subsidiary photo spacers in the sets of the photo spacers decreases in sequence along the direction from the periphery of the display area X towards the center of the display area X, which satisfies the rule of the distribution of the intensity of ripples.

In an example, the annular area X2 has a width W which may be greater than or equal to 2 millimeters and less than or equal to 5 millimeters. It should be noted that in FIG. 3, the display area X is a rectangular area and the central closed area X1 is also a rectangular area. In this way, the annular area X2 is a rectangular ring area and the width of the annular area X2 is the minimum distance between the central closed area X1 and any one side of the display area X. Alternatively, the display area and the central closed area may both have circular shapes. In this way, the annular area will be a circular ring area and the width of the annular area is a difference between the radius of the display area and the radius of the central closed area.

It should be noted that in the embodiment of the present disclosure, the method for producing the display panel is explained with reference to the example where the color filter substrate is the first substrate. In practice, the first substrate may also be an array substrate. In this circumstance, the Step 601 may become: forming a TFT structure on a base substrate to obtain the first substrate. In particular, the specific steps of forming the TFT structure on the base substrate may follow those steps of forming the TFT structure on the base substrate in the prior art. The details thereof will be omitted herein. Then the photo resist layer may be formed on the base substrate formed with the TFT structure with reference to the Step 602 and the photo resist layer is patterned with single patterning process by a multicolor or grayscale mask to form the plurality of sets of the photo spacers arranged in array with reference to the Step 603.

Step 604: forming a second substrate.

As an example, when the first substrate is a color filter substrate, the second substrate may be the array substrate. The specific steps for forming the second substrate may follow those of forming the array substrate in the prior art. The details thereof will be omitted herein. It should be noted that the second substrate may be the color filter substrate when the first substrate is the array substrate.

Step 605: assembling the first substrate and the second substrate opposed to each other, the main photo spacers, the first subsidiary photo spacers and the second subsidiary photo spacers being arranged between the first substrate and the second substrate.

After the first substrate and the second substrate are formed and the main photo spacers, the first subsidiary photo spacers and the second subsidiary photo spacers are formed on the first substrate, the first substrate and the second substrate may be opposed to each other and assembled. In such circumstance, the main photo spacers, the first subsidiary photo spacers and the second subsidiary photo spacers are arranged between the first substrate and the second substrate.

Step 606: charging liquid crystal into a space between the first substrate and the second substrate.

After the first substrate and the second substrate are assembled, the liquid crystal may be charged into the space between the first substrate and the second substrate to form a liquid crystal layer, so as to form a liquid crystal cell composed of the first substrate, the second substrate and the liquid crystal layer. It should be noted that after the liquid crystal layer is formed, the liquid crystal cell also needs to be vacuumized, that is, the air in the liquid crystal cell is extracted out completely. In an example, before the liquid crystal cell is vacuumized, the height of the main photo spacers may be greater than the thickness of the liquid crystal layer and the height of the first subsidiary photo spacers is equal to the thickness of the liquid crystal layer and the thickness of the liquid crystal layer is greater than the height of the second subsidiary photo spacers; or before the liquid crystal cell is vacuumized, the height of the main photo spacers and the height of the first subsidiary photo spacers may be greater than the thickness of the liquid crystal layer and the thickness of the liquid crystal layer is greater than the height of the second subsidiary photo spacers.

After the liquid crystal cell is vacuumized, the distance between the first substrate and the second substrate is equal to the thickness of the liquid crystal cell and the thickness of the liquid crystal cell is equal to the thickness of the liquid crystal layer.

On one hand, assuming that before the liquid crystal cell is vacuumized, the height of the main photo spacers may be greater than the thickness of the liquid crystal layer, the height of the first subsidiary photo spacers is equal to the thickness of the liquid crystal layer and the thickness of the liquid crystal layer is greater than the height of the second subsidiary photo spacers, the main photo spacers 02 and the first subsidiary photo spacers 03 will both be bent (not shown in FIG. 4) but the second subsidiary photo spacers 04 will not be bent after the liquid crystal cell is vacuumized. The height of the bent main photo spacers 02 and the height of the bent first subsidiary photo spacers 03 will both be equal to the thickness of the liquid crystal layer 21, and the height of the second subsidiary photo spacers 04 will still be less than the thickness of the liquid crystal layer 21. On the other hand, assuming that before the liquid crystal cell is vacuumized, the height of the main photo spacers is greater than the thickness of the liquid crystal layer, the height of the first subsidiary photo spacers is equal to the thickness of the liquid crystal layer and the height of the second subsidiary photo spacers is less than the thickness of the liquid crystal layer, the main photo spacers will be bent but the second subsidiary photo spacers will not be bent after the liquid crystal cell is vacuumized. The height of the first subsidiary photo spacers and the height of the bent main photo spacers will both be equal to the thickness of the liquid crystal layer, and the height of the second subsidiary photo spacers will be less than the thickness of the liquid crystal layer. It should be noted that if the photo spacers are bent after the liquid crystal cell is vacuumized, the bent photo spacers can provide relatively large supporting force for the first substrate and the second substrate.

As illustrated in FIG. 2, after the liquid crystal cell is vacuumized, the height h1 of the main photo spacers 02 is equal to the height h2 of the first subsidiary photo spacers 03 in the liquid crystal cell, and the height h1 of the main photo spacers 02 and the height h2 of the first subsidiary photo spacers 03 are both equal to the thickness of the liquid crystal layer (not shown in FIG. 2) and both greater than the height h3 of the second subsidiary photo spacers 04; the cross sectional area s2 of the first subsidiary photo spacers 03 is equal to the cross sectional area s3 of the second subsidiary photo spacers 04 and less than the cross sectional area s1 of the main photo spacers 02.

In the art, the CF & Cell (color filter and assembling the substrates into Cell) process has reached the limit of process capability. Thus, when the liquid crystal display screen is pressed, the main photo spacer and the subsidiary photo spacers can block the flow of the liquid crystal. The effective area of the main photo spacers for blocking the flow of liquid crystal is relatively large while the effective area of the subsidiary photo spacers for blocking the flow of liquid crystal is relatively small. And the number of the main photo spacers is relatively small, such that the effect of the main photo spacers and the subsidiary photo spacers on the liquid crystal display screen blocking the flow of the liquid crystal become relatively small, and the intensity of the ripples presented on the liquid crystal display screen becomes strong.

It should be noted that when the display panel is pressed, the liquid crystal in the display panel may flow away from the pressed position, and the flow speed of the liquid crystal is relatively small and the Reynolds number is relatively small. In this circumstance, the flow state of the liquid crystal is a laminar flow state. When the flow state of the liquid crystal is the laminar flow state, the effect of the resistance to the flow speed of the liquid crystal is relatively large and the flow speed of the liquid crystal is positively correlated to the Reynolds number and negatively correlated to the intensity of ripples. In an embodiment of the present disclosure, when the liquid crystal display screen is pressed such that the liquid crystal in the liquid crystal layer flows away from the pressed position, all of the main photo spacers, the first subsidiary photo spacer and the second subsidiary photo spacer can block the flow of the liquid crystal. The effective area of the main photo spacers for blocking the flow of liquid crystal is relatively large, the effective area of the first subsidiary photo spacers for blocking the flow of liquid crystal is also relatively large, and the number of the first subsidiary photo spacers is relatively large. Thus, the effects of the main photo spacers, the first subsidiary photo spacers and the second subsidiary photo spacers for blocking the flow of the liquid crystal become relatively large such that the flowing speed of the liquid crystal is reduced, and the Reynolds number is correspondingly reduced to reduce the intensity of the ripple.

As discussed above, in the display panel produced by the method provided by the embodiment of the present disclosure, the main photo spacer, the first subsidiary photo spacer and the second subsidiary photo spacer are arranged on the side of the first substrate facing towards the second substrate. The height of the main photo spacer is equal to thickness of the liquid crystal layer, and the height of the first subsidiary photo spacer is greater than the height of the second subsidiary photo spacer and less than or equal to the thickness of the liquid crystal layer. When the flow state of the liquid crystal is a laminar flow state, the effect of the resistance to the flow speed of the liquid crystal is relatively large and the flow speed of the liquid crystal is positively correlated to the Reynolds number and negatively correlated to the intensity of ripples. And each of the main photo spacer, the first subsidiary photo spacer and the second subsidiary photo spacer may form resistance to the flow of the liquid crystal and the height of the first subsidiary photo spacer is greater than that of the second subsidiary photo spacer, thus, the effective areas of the main photo spacer, the first subsidiary photo spacer and the second subsidiary photo spacer for blocking the flow of the liquid crystal become relatively large so as to generate relatively large resistance. In this way, the flowing speed of the liquid crystal is reduced, and the Reynolds number is reduced to reduce the intensity of the ripples, so as to improve the display quality of the liquid crystal display screen.

An embodiment of the present disclosure provides a liquid crystal display screen. The liquid crystal display screen may include the display panel 0 shown in FIG. 1, FIG. 3 or FIG. 4. The liquid crystal display screen may be any products or components having liquid crystal display function such as electronic paper, display screens of cell phones, display screens of tablet computers or display screens of notebook computers.

As discussed above, in the liquid crystal display screen provided by the embodiment of the present disclosure, the main photo spacer, the first subsidiary photo spacer and the second subsidiary photo spacer are arranged on the side of the first substrate facing towards the second substrate. The height of the main photo spacer is equal to the thickness of the liquid crystal layer, and the height of the first subsidiary photo spacer is greater than the height of the second subsidiary photo spacer and less than or equal to the thickness of the liquid crystal layer. When the flow state of the liquid crystal is a laminar flow state, the effect of the resistance to the flow speed of the liquid crystal is relatively large and the flow speed of the liquid crystal is positively correlated to the Reynolds number and negatively correlated to the intensity of ripples. And each of the main photo spacer, the first subsidiary photo spacer and the second subsidiary photo spacer may form resistance to the flow of the liquid crystal and the height of the first subsidiary photo spacer is greater than that of the second subsidiary photo spacer, thus, the effective areas of the main photo spacer, the first subsidiary photo spacer and the second subsidiary photo spacer for blocking the flow of the liquid crystal become relatively large so as to generate relatively large resistance. In this way, the flowing speed of the liquid crystal is reduced, and the Reynolds number is correspondingly reduced to reduce the intensity of the ripples, so as to improve the display quality of the liquid crystal display screen.

The skilled person in the art can appreciate that, for the sake of convenience and brief, the described specific steps of the above method for producing the display panel may follow the corresponding processes in the above embodiments of the display panel. The details will be omitted herein.

The above embodiments are exemplary embodiments of the present disclosure, instead of limiting the present disclosure. All of modifications, alternatives, improvements made without departing from the principles and spirit of the disclosure should fall within the protection scope of the present disclosure.

What is claimed is:

1. A display panel comprising:
a first substrate and a second substrate assembled and opposed to each other; and
a liquid crystal layer arranged between the first substrate and the second substrate,
wherein a main photo spacer, a first subsidiary photo spacer and a second subsidiary photo spacer are arranged on a side of the first substrate facing towards the second substrate, and the main photo spacer has a height equal to a thickness of the liquid crystal layer, and the first subsidiary photo spacer has a height greater than a height of the second subsidiary photo spacer and less than or equal to the thickness of the liquid crystal layer,
wherein the first substrate comprises a display area and a non-display area surrounding the display area, the display area being composed of a central closed area and an annular area surrounding the central closed area, and a plurality of sets of the photo spacers are arranged in array in the display area on the first substrate;
wherein the sets of the photo spacers arranged in the central closed area comprise the main photo spacers and the second subsidiary photo spacers;
wherein the sets of the photo spacers arranged in the annular area comprise the main photo spacers and the first subsidiary photo spacers or comprise the main photo spacers, the first subsidiary photo spacers and the second subsidiary photo spacers; and
wherein the first subsidiary photo spacers arranged in the sets of the photo spacers in the annular area have a density which decreases gradually along a direction from a periphery of the display area towards a center of the display area.

2. The display panel according to claim 1, wherein the height of the first subsidiary photo spacer is equal to the thickness of the liquid crystal layer, and the first subsidiary photo spacer has a cross sectional area equal to a cross sectional area of the second subsidiary photo spacer and less than across sectional area of the main photo spacer.

3. The display panel according to claim 1, wherein the first subsidiary photo spacers arranged in the sets of the photo spacers in the annular area have a density which decreases gradually in a descending order of power along the direction from the periphery of the display area towards the center of the display area.

4. The display panel according to claim 1, wherein the annular area has a width which is greater than or equal to 2 millimeters and less than or equal to 5 millimeters.

5. The display panel according to claim 1, wherein quantity of the first subsidiary photo spacers is greater than that of the main photo spacers.

6. A liquid crystal display screen, comprising the display panel according to claim 1.

7. The liquid crystal display screen according to claim 6, wherein the height of the first subsidiary photo spacer is equal to the thickness of the liquid crystal layer, and the first subsidiary photo spacer has a cross sectional area equal to a cross sectional area of the second subsidiary photo spacer and less than a cross sectional area of the main photo spacer.

8. The liquid crystal display screen according to claim 6, wherein the first subsidiary photo spacers arranged in the sets of the photo spacers in the annular area have a density which decreases gradually in a descending order of power along the direction from the periphery of the display area towards the center of the display area.

9. The liquid crystal display screen according to claim 6, wherein the annular area has a width which is greater than or equal to 2 millimeters and less than or equal to 5 millimeters.

10. A method for producing a display panel, the method comprising:
    forming a first substrate;
    forming a second substrate; and
    assembling the first substrate and the second substrate to be opposed to each other and charging liquid crystal into a space between the first substrate and the second substrate to form a liquid crystal layer, wherein the first substrate, the second substrate and the liquid crystal layer form a liquid crystal cell,
    wherein the method further comprises forming a main photo spacer, a first subsidiary photo spacer and a second subsidiary photo spacer on a side of the first substrate facing towards the second substrate before assembling the first substrate and the second substrate, and wherein in the formed liquid crystal cell, the main photo spacer has a height equal to a thickness of the liquid crystal layer, and the first subsidiary photo spacer has a height greater than a height of the second subsidiary photo spacer and less than or equal to the thickness of the liquid crystal layer,
    wherein the first substrate comprises a display area and a non-display area surrounding the display area, the display area being composed of a central closed area and an annular area surrounding the central closed area, and
    forming a main photo spacer, a first subsidiary photo spacer and a second subsidiary photo spacer on a side of the first substrate facing towards the second substrate comprises:
    forming a plurality of sets of the photo spacers arranged in array in the display area on the first substrate;
    wherein the sets of the photo spacers arranged in the central closed area comprise the main photo spacers and the second subsidiary photo spacers;
    wherein the sets of the photo spacers arranged in the annular area comprise the main photo spacers and the first subsidiary photo spacers or comprise the main photo spacers, the first subsidiary photo spacers and the second subsidiary photo spacers; and
    wherein the first subsidiary photo spacers arranged in the sets of the photo spacers in the annular area have a density which decreases gradually along a direction from a periphery of the display area towards a center of the display area.

11. The method according to claim 10, wherein the height of the first subsidiary photo spacer is equal to the thickness of the liquid crystal layer, and the first subsidiary photo spacer has a cross sectional area equal to a cross sectional area of the second subsidiary photo spacer and less than a cross sectional area of the main photo spacer.

12. The method according to claim 10, wherein the first subsidiary photo spacers arranged in the sets of the photo spacers in the annular area have a density which decreases gradually in a descending order of power along the direction from the periphery of the display area towards the center of the display area.

13. The method according to claim 10, wherein forming a plurality of sets of the photo spacers arranged in array in the display area on the first substrate comprises:
    forming a photoresist layer in the display area on the first substrate;
    patterning the photoresist layer by using a multicolor or grayscale mask through a single patterning process to form the plurality of sets of the photo spacers arranged in array.

14. The method according to claim 10, wherein the annular area has a width which is greater than or equal to 2 millimeters and less than or equal to 5 millimeters.

* * * * *